United States Patent
Chen et al.

(10) Patent No.: US 10,304,596 B1
(45) Date of Patent: May 28, 2019

(54) PTC CIRCUIT PROTECTION DEVICE AND METHOD OF MAKING THE SAME

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/808,445

(22) Filed: Nov. 9, 2017

(51) Int. Cl.
| | |
|---|---|
| *H01C 1/084* | (2006.01) |
| *H01C 1/14* | (2006.01) |
| *H02H 9/02* | (2006.01) |
| *H01C 17/28* | (2006.01) |
| *H01C 7/02* | (2006.01) |

(52) U.S. Cl.
CPC ........... *H01C 1/084* (2013.01); *H01C 1/1406* (2013.01); *H01C 7/027* (2013.01); *H01C 17/28* (2013.01); *H02H 9/026* (2013.01)

(58) Field of Classification Search
CPC ....... H01C 1/084; H01C 7/027; H01C 1/1406
USPC ...................................................... 200/22 R
See application file for complete search history.

(56) References Cited

U.S. PATENT DOCUMENTS

| | | | | |
|---|---|---|---|---|
| 5,351,026 A | * | 9/1994 | Kanbara | H01C 1/034 338/22 R |
| 5,777,541 A | * | 7/1998 | Vekeman | H01C 7/02 338/22 R |
| 5,990,779 A | * | 11/1999 | Katsuki | H01C 1/1406 174/549 |
| 6,690,258 B2 | * | 2/2004 | Katsuki | H01C 1/1406 338/22 R |
| 7,164,341 B2 | * | 1/2007 | Katsuki | H01C 1/1406 338/22 R |
| 8,508,328 B1 | * | 8/2013 | Chen | H01C 7/028 338/13 |
| 2012/0056709 A1 | * | 3/2012 | Kajino | C01G 31/006 338/22 R |
| 2013/0187748 A1 | * | 7/2013 | Sha | H01C 1/084 338/22 R |

* cited by examiner

*Primary Examiner* — Kyung S Lee
*Assistant Examiner* — Iman Malakooti
(74) *Attorney, Agent, or Firm* — Michael Best & Friedrich LLP

(57) ABSTRACT

A PTC circuit protection device adapted to be mounted on a substrate, includes: a PPTC component; a first electrically conductive unit including a first electrically conductive member and a first conductive pin member that has a first distal end to be in contact with the substrate, a first stand-off height from the first electrically conductive member to the first distal end being not less than 0.1 mm; and a second electrically conductive unit including a second electrically conductive member and a second conductive pin member that has a second distal end to be in contact with the substrate, a second stand-off height from the first electrically conductive member to the second distal end being not less than 0.1 mm.

10 Claims, 2 Drawing Sheets

PTC CIRCUIT PROTECTION DEVICE AND METHOD OF MAKING THE SAME

FIELD

This disclosure relates to a PTC circuit protection device and a method of making the same, more particularly to a surface-mounted PTC circuit protection device and a method of making the same.

BACKGROUND

Referring to FIG. 1, U.S. Pat. No. 5,852,397 disclosed a conventional surface-mounted PTC circuit protection device 1 which can be mounted on a substrate 9 (such as a circuit board). The PTC circuit protection device 1 includes a PTC component 13, a first electrode portion 11, and a second electrode portion 12, a first conductive portion 14, and a second conductive portion 15. Further, plating layers 18 are formed on the first and second electrode portions 11, 12 and the first and second conductive portions 14, 15.

To mount the aforementioned device 1 on top of the substrate 9, the plating layers 18 of the conventional surface-mounted PTC circuit protection device 1 is directly placed on and soldered to the substrate 9. However, such design may be disadvantageous for heat dissipation of the substrate 9 and the PTC circuit protection device 1. Thus, the PTC circuit protection device 1 may have inferior operating efficiency which may cause damage due to overheating.

SUMMARY

Therefore, an object of the present disclosure is to provide a PTC circuit protection device and a method of making the same that can overcome at least one of the aforesaid drawbacks associated with the prior art.

According to one aspect of this disclosure, a PTC circuit protection device adapted to be mounted on a substrate includes:

a polymer positive temperature coefficient (PPTC) component that includes
a PTC polymeric layer having two opposite surfaces, and first and second electrodes respectively disposed on the two opposite surfaces of the PTC polymeric layer;
a first electrically conductive unit that includes
a first electrically conductive member disposed on and electrically connected to the first electrode layer oppositely of the PTC polymeric layer, and having an end portion, and
a first conductive pin member extending from the end portion of the first electrically conductive member toward the substrate, and having a first distal end which is distal from the end portion of the first electrically conductive member and is to be in contact with the substrate, wherein a first stand-off height from the first electrically conductive member to the first distal end is not less than 0.1 mm; and
a second electrically conductive unit that includes
a second electrically conductive member disposed on and electrically connected to the second electrode layer oppositely of the PTC polymeric layer, and having an end portion, and
a second conductive pin member extending from the end portion of the second electrically conductive member toward the substrate, and having a second distal end which is distal from the end portion of the second electrically conductive member and is to be in contact with the substrate, wherein a second stand-off height from the first electrically conductive member to the second distal end is not less than 0.1 mm.

According to another aspect of this disclosure, a method of making a PTC circuit protection device adapted to be mounted on a substrate is provided. The method includes:

providing a polymer positive temperature coefficient component that includes a PTC polymeric layer having two opposite surfaces, and first and second electrodes respectively disposed on the two opposite surfaces of the PTC polymeric layer;

disposing a first electrically conductive unit on the first electrode layer oppositely of the PTC polymeric layer, bending the first electrically conductive unit, so that the first electrically conductive unit includes a first electrically conductive member and a first conductive pin member, the first electrically conductive member being disposed on and electrically connected to the first electrode layer oppositely of the PTC polymeric layer and having an end portion, the first conductive pin member being inclinedly extending from the end portion of the first electrically conductive member toward the substrate and having a first distal end which is distal from the end portion of the first electrically conductive member and is to be in contact with the substrate, wherein a first stand-off height from the first electrically conductive member to the first distal end is not less than 0.1 mm;

disposing a second electrically conductive unit on the second electrode layer oppositely of the PTC polymeric layer, bending the second electrically conductive unit, so that the second electrically conductive unit includes a second electrically conductive member and a second conductive pin member, the second electrically conductive member being disposed on and electrically connected to the second electrode layer oppositely of the PTC polymeric layer and having an end portion, the second conductive pin member being inclinedly extending from the end portion of the second electrically conductive member toward the substrate, and having a second distal end which is distal from the end portion of the second electrically conductive member and is to be in contact with the substrate, wherein a second stand-off height from the first electrically conductive member to the second distal end is not less than 0.1 mm.

BRIEF DESCRIPTION OF THE DRAWINGS

Other features and advantages of the disclosure will become apparent in the following detailed description of the embodiment with reference to the accompanying drawing, of which.

DETAILED DESCRIPTION

Figure 2:
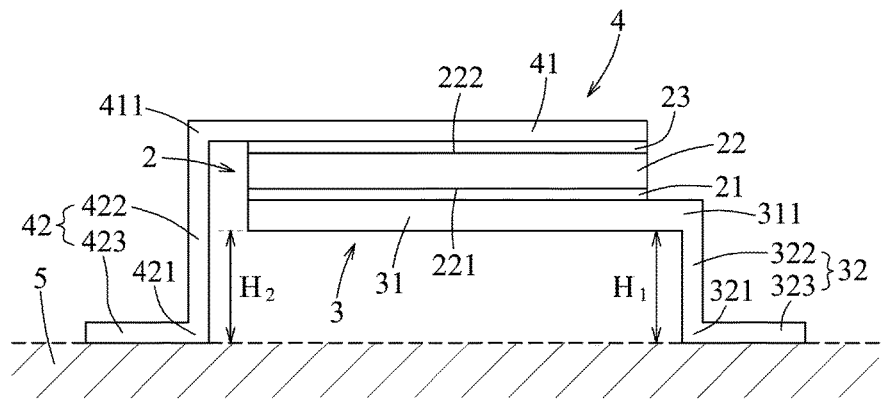
FIG. 2 is a schematic view showing an embodiment of a PTC circuit protection device according to this disclosure which is mounted on a substrate.

FIG. 2 illustrates the embodiment of a positive temperature coefficient (PTC) circuit protection device adapted to be mounted on a substrate 5. The PTC circuit protection device includes a polymer positive temperature coefficient (PPTC) component 2, a first electrically conductive unit 3 and a second electrically conductive unit 4.

The PPTC component 2 includes a PTC polymeric layer 22 having two opposite surfaces 221, 222, and first and second electrodes 21, 23 respectively disposed on the two opposite surfaces of the PTC polymeric layer 22.

The first electrically conductive unit 3 includes a first electrically conductive member 31 and a first conductive pin member 32. The first electrically conductive member 31 is disposed on and electrically connected to the first electrode layer 21 oppositely of the PTC polymeric layer 22, and has an end portion 311. The first conductive pin member 32 extends from the end portion 311 of the first electrically conductive member 31 toward the substrate 5, and has a first distal end 321 which is distal from the end portion 311 of the first electrically conductive member 31 and is to be in contact with the substrate 5. A first stand-off height (H1) from the first electrically conductive member 31 to the first distal end 321 is not less than 0.1 mm.

In this embodiment, the first conductive pin member 32 includes a first support portion 322 and a first extending portion 323. The first conductive pin member 32 extends toward the substrate 5 from the end portion 311 of the first electrically conductive member 31 and has the first distal end 321. The first extending portion 323 inclinedly extends from the first distal end 321 of the first support portion 322 and is to be in contact with the substrate 5 so as to enhance the contact area between the PTC circuit protection device and the substrate 5, thereby improving stability of the PTC circuit protection device.

In certain embodiments, the first support portion 322 inclinedly extends from the end portion 311 of the first electrically conductive member 31. In some embodiments, the first support portion 322 and the first electrically conductive member 31 are arranged to form a right angle. In some embodiments, the first support portion 322 and the first extending portion 323 are arranged to form a right angle.

It should be noted that the shape of the first electrically conductive unit 3 may vary based on practical requirements.

The second electrically conductive unit 4 includes a second electrically conductive member 41 and a second conductive pin member 42. The second electrically conductive member 41 is disposed on the and electrically connected to the second electrode layer 23 oppositely of the PTC polymeric layer 22, and has an end portion 411. The second conductive pin member 42 extends from the end portion 411 of the second electrically conductive member 41 toward the substrate 5, and has a second distal end 421 which is distal from the end portion 411 of the second electrically conductive member 41 and is to be in contact with the substrate 5. A second stand-off height (H2) from the first electrically conductive member 31 to the second distal end 421 is not less than 0.1 mm.

In this embodiment, the second conductive pin member 42 includes a second support portion 422 and a second extending portion 423. The second support portion 422 extends toward the substrate 5 from the end portion 411 of the second electrically conductive member 41 and has the second distal end 421. The second extending portion 423 inclinedly extends from the second distal end 421 of the second support portion 422 and is to be in contact with the substrate 5 so as to enhance the contact area between the PTC circuit protection device and the substrate 5, thereby improving stability of the PTC circuit protection device.

In certain embodiments, the second support portion 422 inclinedly extends from the end portion 411 of the second electrically conductive member 41. In some embodiments, the second support portion 422 and the second electrically conductive member 41 are arranged to form a right angle. In some embodiments, the second support portion 422 and the second extending portion 423 are arranged to form a right angle.

It should be noted that the shape of the second electrically conductive unit 4 may vary based on practical requirements.

With the first and second stand-off heights (H1, H2) not less than 0.1 mm, a space would be formed between the substrate 5 and the first and second electrically conductive members 31, 41 so as to facilitate heat dissipation of the PTC circuit protection device and to accommodate thermal expansion of the PTC circuit protection device due to the increased working temperature. In certain embodiments, each of the first and second stand-off heights (H1, H2) ranges from 0.2 mm to 2.0 mm.

In certain embodiments, each of the first and second stand-off heights (H1, H2) ranges from 1.0 mm to 2.0 mm.

In this embodiment, the first electrically conductive member 31 and the first conductive pin member 32 are integrally formed in one piece, and the second electrically conductive member 41 and the second conductive pin member 42 are integrally formed in one piece.

Each of the first electrically conductive unit 3 and the second electrically conductive unit 4 may be made from a conductive material, e.g., metal, an electrically conductive ceramic material, etc. In certain embodiments, each of the first electrically conductive unit 3 and the second electrically conductive unit 4 is made from nickel.

In certain embodiments, the PTC polymeric layer 22 includes a polymer matrix and a particulate conductive filler dispersed in the polymer matrix. The polymer matrix includes a non-grafted olefin-based polymer.

In certain embodiments, the polymer matrix further includes a carboxylic acid anhydride-grafted olefin-based polymer. The carboxylic acid anhydride-grafted olefin-based polymer may be maleic anhydride-grafted olefin-based polymer. In this embodiment, the maleic anhydride-grafted olefin-based polymer is maleic anhydride-grafted high density polyethylene (HDPE).

In certain embodiments, the non-grafted olefin-based polymer is HDPE.

In certain embodiments, examples of the particulate conductive filler includes carbon black, metal, and an electrically conductive ceramic material.

In certain embodiments, each of the first electrode layer 21 and the second electrode layer 23 is a nickel plated copper foil.

A method for manufacturing the embodiment of the PTC circuit protection device includes the following steps.

Step 1: providing a polymer positive temperature coefficient (PPTC) component 2 that includes a PTC polymeric layer 22 having two opposite surfaces 221, 222, and first and second electrodes 21, 23 respectively disposed on the two opposite surfaces of the PTC polymeric layer 22.

Step 2: disposing a first electrically conductive unit 3 on the first electrode layer 21 oppositely of the PTC polymeric layer 22.

Step 3: bending the first electrically conductive unit 3, so that the first electrically conductive unit 3 includes a first electrically conductive member 31 and a first conductive pin member 32, the first electrically conductive member 31 being disposed on and electrically connected to the first electrode layer 21 oppositely of the PTC polymeric layer 22 and having an end portion 311, the first conductive pin member 32 being inclinedly extending from the end portion 311 of the first electrically conductive member 31 toward the substrate 5 and having a first distal end 321 which is distal from the end portion 311 of the first electrically conductive member 31 and is to be in contact with the substrate 5, wherein a first stand-off height (H1) from the first electrically conductive member 31 to the first distal end 321 is not less than 0.1 mm.

Step 4: disposing a second electrically conductive unit 4 on the second electrode layer 23 oppositely of the PTC polymeric layer 22.

Step 5: bending the second electrically conductive unit 4, so that the second electrically conductive unit 4 includes a second electrically conductive member 41 and a second conductive pin member 42, the second electrically conductive member 41 being inclinedly extending from the end portion 411 of the second electrically conductive member 41 toward the substrate 5, and having a second distal end 421 which is distal from the end portion 411 of the second electrically conductive member 41 and is to be in contact with the substrate 5, wherein a second stand-off height (H2) from the first electrically conductive member 31 to the second distal end 421 is not less than 0.1 mm.

The disclosure will be further described by way of the following examples and comparative example. However, it should be understood that the following examples and comparative example are solely intended for the purpose of illustration and should not be construed as limiting the disclosure in practice.

EXAMPLE

Example 1(E1)

10.25 grams of HDPE (purchased from Formosa plastic Corp., catalog no.: HDPE9002) serving as the non-grafted olefin-based polymer, 10.25 grams of maleic anhydride grafted-olefin-based polymer (purchased from Dupont, catalog no.: MB100D) serving as the carboxylic acid anhydride-grafted olefin-based polymer, 29.5 grams of carbon black (trade name: Raven 430UB, commercially available from Columbian Chemicals Company) serving as the particulate conductive filler were compounded in a Brabender mixer. The compounding was carried out at 200° C. for 10 minutes, with a stirring rate of 30 rpm.

The compounded mixture was hot-pressed so as to form a thin sheet of the PTC polymeric layer 22 having a thickness of 0.35 mm. The hot pressing was carried out at 200° C. for 4 minutes, with a pressure of 80 kg/cm2.

Two copper foil sheets (serving as the first and second electrodes 21, 23) were respectively attached to two opposite surfaces of the thin sheet of the PTC polymeric layer 22 and were hot pressed under 200° C. and 80 kg/cm2 for 4 minutes to form a sandwiched structure of a PTC laminate having a thickness of 0.42 mm. The PTC laminate was cut into a plurality of PTC pieces, each of which has a size of 7.4 mm×5.2 mm (i.e. the size of SMD Type-2920). Each PTC piece was irradiated by a cobalt-60 source with a total radiation dose of 150 kGy.

Two nickel layers serving as the first and second electrically conductive units 3, 4 were respectively connected to the copper foil sheets of a respective one of the PTC pieces using a solder material. Each of the nickel layers has a length of 10.0 mm, a width of 5.2 mm, and a thickness of 0.1 mm.

The first electrically conductive unit 3 was bent, so that the first electrically conductive unit 3 included a first electrically conductive member 31 and a first conductive pin member 32. The first electrically conductive member 31 was disposed on and electrically connected to the first electrode layer 21 and having an end portion 311. The first conductive pin member 32 inclinedly extended from the end portion 311 of the first electrically conductive member 31 and has a first distal end 321 which was distal from the end portion 311 of the first electrically conductive member 31 and was to be in contact with a substrate 5 (e.g., a circuit board as mentioned below). The first conductive pin member 32 was bent to form a first support portion 322 and a first extending portion 323. The first support portion 322 extended toward the substrate 5 from the end portion 311 of the first electrically conductive member 31 and has the first distal end 321. The first extending portion 323 inclinedly extended from the first distal end 321 of the first support portion 322.

The second electrically conductive unit 4 was bent, so that the second electrically conductive unit 4 included a second electrically conductive member 41 and a second conductive pin member 42. The second electrically conductive member 41 was disposed on and electrically connected to the second electrode layer 23 and having an end portion 411. The second conductive pin member 42 inclinedly extended from the end portion 411 of the second electrically conductive member 41 toward the substrate 5, and has a second distal end 421 which was distal from the end portion 411 of the second electrically conductive member 41 and was to be in contact with the substrate 5. The second conductive pin member 42 was bent to form a second support portion 422 and a second extending portion 423. The second support portion 422 extends toward the substrate 5 from the end portion 411 of the second electrically conductive member 41 and has the second distal end 421. The second extending portion 423 inclinedly extended from the second distal end 421 of the second support portion 422.

A test sample of the PTC circuit protection device thus obtained has a shape as shown in FIG. 2, and was mounted on a circuit board (i.e., the substrate 5). A first stand-off height (H1) from the first electrically conductive member 31 to the first distal end 321 was 0.11 mm. A second stand-off height (H2) from the first electrically conductive member 31 to the second distal end 421 was 0.11 mm. That is, the distance between the first electrically conductive member 31 and the circuit board 5 was 0.11 mm.

The electrical property of the test sample of Example 1 (E1) was determined, and the results are shown in Table 1.

Example 2 (E2)

Figure 3:
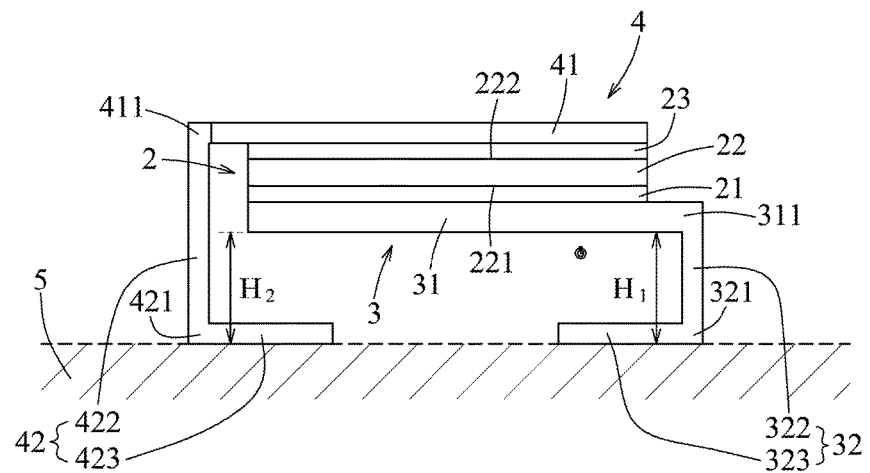
FIG. 3 is a schematic view of Examples 2, 4, 6 and 8 of a PTC circuit protection device according to this disclosure which is mounted on a substrate.

The procedures and conditions in preparing PTC circuit protection devices of Example 2 (E2) were similar to those of Example 1, except that the first extending portion 323 and the second extending portion 423 were extending toward each other. FIG. 3 illustrates Example 2 of a PTC circuit protection device.

The electrical property of the test sample of Example 2 (E2) was determined, and the results are shown in Table 1.

Examples 3, 5 and 7 (E3, E5 and E7)

The procedures and conditions in preparing PTC circuit protection devices of Examples 3, 5 and 7 (E3, E5 and E7) were similar to those of Example 1 (having a shape as shown in FIG. 2), except that each of the first and second stand-off heights (H1,H2) of Example 3 was 0.2 mm, each of the first and second stand-off heights (H1,H2) of Example 5 was 1.0 mm, and each of the first and second stand-off heights (H1,H2) of Example 7 was 2.0 mm.

The electrical property of the PTC circuit protection device of Examples 3, 5 and 7 (E3, E5 and E7) were determined, and the results are shown in Table 1.

Examples 4, 6 and 8 (E4, E6 and E8)

The procedures and conditions in preparing PTC circuit protection devices of Examples 4, 6 and 8 (E4, E6 and E8) were similar to those of Example 2 (having a shape as shown in FIG. 3), except that each of the first and second stand-off heights (H1,H2) of Example 4 was 0.2 mm, each of the first and second stand-off heights (H1,H2) of Example 6 was 1.0 mm, and each of the first and second stand-off heights (H1,H2) of Example 8 was 2.0 mm.

The electrical property of the PTC circuit protection device of Examples 4, 6 and 8 (E4, E6 and E8) were determined, and the results are shown in Table 1.

Comparative Example 1 (CE1)

Figure 1:
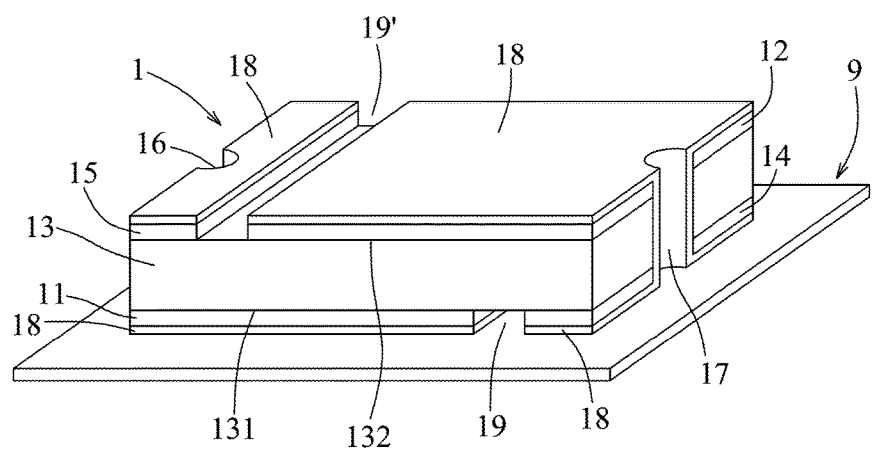
FIG. 1 is a perspective view to illustrate a conventional PTC circuit protection device mounted on a substrate.

Comparative Example 1 of a PTC circuit protection device 1 has a structure as shown in FIG. 1, in which the first and second electrically conductive members 14, 15 were directly attached onto a circuit board serving as a substrate 9. Preparation of the PTC circuit protection device 1 of Comparative Example 1 was described as follows.

10.25 grams of HDPE (purchased from Formosa plastic Corp., catalog no.: HDPE9002) serving as the non-grafted olefin-based polymer, 10.25 grams of maleic anhydride-grafted olefin-based polymer (purchased from Dupont, catalog no.: MB100D) serving as the carboxylic acid anhydride-grafted olefin-based polymer, 29.5 grams of carbon black (trade name: Raven 430UB, commercially available from Columbian Chemicals Company) serving as the particulate conductive filler were compounded in a Brabender mixer. The compounding was carried out at 200° C. for 10 minutes, with a stirring rate of 30 rpm.

The compounded mixture was hot-pressed so as to form a thin sheet of the PTC polymeric layer 13 having a thickness of 0.35 mm. The hot pressing was carried out at 200° C. for 4 minutes, with a pressure of 80 kg/cm2.

First and second copper foil sheets were respectively attached to the first and second surfaces 131, 132 of the thin sheet of the PTC polymeric layer 13 and were hot-pressed under 200° C. and 80 kg/cm2 for 4 minutes to form a sandwiched structure of a PTC laminate having thickness of 0.42 mm. The PTC laminate was cut into a plurality of PTC pieces, each of which has a size of 7.4 mm×5.2 mm (i.e. the size of SMD Type-2920). Each PCT piece was irradiated by a cobalt-60 source with a total radiation dose of 150 kGy.

Two semi-circular conductive holes coated with metal layers (serving as first and second electrically conductive connecting members 16, 17) were formed on two opposite sides of each PTC piece. A plating layer 18 was electrolessly plated onto each of the first and second copper foil sheets. The plating layers 18 and the first and second copper foil sheets were etched to form two grooves (first and second grooves 19, 19') from which the PTC component 13 is exposed. After etching, the first copper foil sheet was divided into a first electrode portion 11 and a first conductive portion 14 separated from the first electrode portion 11. The second copper foil sheet was divided into a second electrode portion 12 and a second conductive portion 15 separated from the second electrode portion 12. The first electrode portion 11 was electrically connected to the second conductive portion 15 through the first electrically conductive connecting member 16 and electrically insulated from the second electrode portion 12. The second electrode portion 12 was electrically connected to the first conductive portion 14 through the second electrically conductive connecting member 17 and electrically insulated from the first electrode portion 11. The test samples of Comparative Example 1 (CE1) were thus obtained.

The electrical property of the test samples of Comparative Example 1 (CE1) was determined, and the results are shown in Table 1.

Comparative Example 2 (CE2)

The procedures and conditions in preparing PTC circuit protection devices of Comparative Example 2 (CE2) were similar to those of Example 1, except that each of the first and second stand-off heights (H1,H2) of Comparative Example 2 was 0.08 mm.

The electrical property of the test samples of Comparative Example 2 (CE2) was determined, and the results are shown in Table 1.

TABLE 1

| | Structural features | | |
|---|---|---|---|
| Sample | FIG. | Each of $H_1$ and $H_2$ (mm) | Resistance (Ri, ohm) |
| E 1 | 2 | 0.11 | 0.049 |
| E 2 | 3 | 0.11 | 0.049 |
| E 3 | 2 | 0.20 | 0.048 |
| E 4 | 3 | 0.20 | 0.049 |
| E 5 | 2 | 1.00 | 0.047 |
| E 6 | 3 | 1.00 | 0.048 |
| E 7 | 2 | 2.00 | 0.048 |
| E 8 | 3 | 2.00 | 0.049 |
| CE 1 | 1 | 0.00 | 0.053 |
| CE 2 | 2 | 0.08 | 0.050 |

<Performance Test>

Surface Temperature Test

Ten test samples of the PTC circuit protection device for each of Examples 1 to 8 and Comparative Examples 1 to 2 were subjected to surface temperature test for determining the surface temperature of each test sample.

In this experiment, the PTC circuit protection device in each of E1 to E8 and CE1 to CE2 was tripped, and the surface temperature of each of the PTC circuit protection device was measured for 10 minutes. The experiment was conducted under a fixed DC voltage of 16V and a current of 5 A at 25° C. Ten test samples of the device of each of E1 to E8 and CE1 to CE2 were subjected to such experiment, and the average values thereof are calculated and listed in Table 2.

As shown in Table 2, the results show that the surface temperatures of E1 to E8 (105 to 110.8° C.) are significantly lower than those of CE1 and CE2 (115.6 and 116.2° C.), which demonstrates that the PTC circuit protection device of this disclosure can effectively dissipate heat.

Switching Cycle Test

Ten test samples of the PTC circuit protection device for each of E1 to E8 and CE1 and CE2 were subjected to a switching cycle test.

The switching cycle test was conducted under a voltage of 16 Vdc and a current of 100 A by switching each test sample on for 60 seconds and then off for 60 seconds per cycle for 6000 cycles. The resistances of each test sample before (Ri) and after (Rf) 6000 cycles were measured. A percentage of average resistance variation (Rf/Ri⊐100%) of the test sample for each of E1 to E8 and CE1 and CE2 was determined. The results of the switching cycle test are shown in Table 2.

Table 2 shows that the test samples of each of E1 to E8 have a lower percentage of average resistance variation (2440% to 3235%) compared to those of CE1 and CE2 (4994% and 4906%).

Aging Test

Ten test samples for each of E1 to E8 and CE1 and CE2 were subjected to an aging test. The aging test was conducted by applying a voltage of 16 Vdc and a current of 100 A to each test sample for 1000 hours. The resistance of each test sample before (Ri) and after (Rf) 1000 hours were measured. A percentage of average resistance variation (Rf/Ri ⊐100%) of the test sample for each of E1 to E8 and CE1 and CE2 was determined. The results of the aging test are shown in Table 2.

The results reveal that the percentage of average variation of E1 to E8 (367% to 531%) are much lower compared to those of CE1 and CE2 (760% to 796%), which demonstrates that the PTC circuit protection device of the disclosure is more reliable.

TABLE 2

|  | Surface temperature at trip state (° C.) | Switching cycle test Rf | Switching cycle test Rf/Ri (%) | Aging test Rf | Aging test Rf/Ri (c/o) |
|---|---|---|---|---|---|
| E 1 | 110.8 | 1.578 | 3220% | 0.258 | 527% |
| E 2 | 110.7 | 1.585 | 3235% | 0.257 | 524% |
| E 3 | 110.2 | 1.544 | 3217% | 0.255 | 531% |
| E 4 | 111.5 | 1.533 | 3129% | 0.249 | 508% |
| E 5 | 107.3 | 1.238 | 2634% | 0.196 | 417% |
| E 6 | 108.1 | 1.243 | 2590% | 0.195 | 406% |
| E 7 | 105.3 | 1.171 | 2440% | 0.176 | 367% |
| E 8 | 105.0 | 1.198 | 2445% | 0.181 | 369% |
| CE 1 | 116.2 | 2.647 | 4994% | 0.403 | 760% |
| CE 2 | 115.6 | 2.453 | 4906% | 0.398 | 796% |

In conclusion, with the inclusion of the first and second stand-off heights (H1, H2) in the PTC circuit protection device of this disclosure, the aforesaid heat dissipation problem associated with the prior art could be alleviated and the surface temperature of the PTC circuit protection device can be significantly decreased, therefore the reliability of the PTC circuit protection device of this disclosure is improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A PTC circuit protection device adapted to be mounted on a substrate, comprising:
    a polymer positive temperature coefficient (PPTC) component that includes
    a PTC polymeric layer having two opposite surfaces, and first and second electrodes respectively disposed on said two opposite surfaces of said PTC polymeric layer;
    a first electrically conductive unit that includes
        a first electrically conductive member disposed on and electrically connected to said first electrode oppositely of said PTC polymeric layer, and having an end portion, and
        a first conductive pin member extending from said end portion of said first electrically conductive member toward the substrate, and having a first distal end which is distal from said end portion of said first electrically conductive member and is to be in contact with the substrate, wherein a first stand-off height from said first electrically conductive member to said first distal end ranges from 1.0 mm to 2.0 mm; and
    a second electrically conductive unit that includes
        a second electrically conductive member disposed on and electrically connected to said second electrode oppositely of said PTC polymeric layer, and having an end portion, and
        a second conductive pin member extending from said end portion of said second electrically conductive member toward the substrate, and having a second distal end which is distal from said end portion of said second electrically conductive member and is to be in contact with the substrate, wherein a second stand-off height from said first electrically conductive member to said second distal end ranges from 1.0 mm to 2.0 mm.

2. The PTC circuit protection device as claimed in claim 1, wherein said first electrically conductive member and said first conductive pin member are integrally formed in one piece, and said second electrically conductive member and said second conductive pin member are integrally formed in one piece.

3. The PTC circuit protection device as claimed in claim 1, wherein
    said first conductive pin member includes
        a first support portion extending toward the substrate from said end portion of said first electrically conductive member and having said first distal end, and
        a first extending portion inclinedly extending from said first distal end of said first support portion; and
    said second conductive pin member includes
        a second support portion extending toward the substrate from said end portion of said second electrically conductive member and having said second distal end, and
        a second extending portion inclinedly extending from said second distal end of said second support portion.

4. The PTC circuit protection device as claimed in claim 3, wherein said first support portion is inclined with respect to said end portion of said first electrically conductive member, and said second support portion is inclined with respect to said end portion of said second electrically conductive member.

5. The PTC circuit protection device as claimed in claim 1, wherein each of said first electrically conductive unit and said second electrically conductive unit is made from nickel.

6. The PTC circuit protection device as claimed in claim 1, wherein said PTC polymeric layer includes a polymer matrix and a particulate conductive filler dispersed in said polymer matrix, the polymer matrix including a non-grafted olefin-based polymer.

7. The PTC circuit protection device as claimed in claim 6, wherein said polymer matrix further includes a carboxylic acid anhydride-grafted olefin-based polymer.

8. The PTC circuit protection device as claimed in claim 6, wherein said particulate conductive filler is selected from the group consisting of carbon black, metal, an electrically conductive ceramic material, and combinations thereof.

9. The PTC circuit protection device as claimed in claim 1, wherein each of said first electrode layer and said second electrode layer is a nickel plated copper foil.

10. A method of making a PTC circuit protection device adapted to be mounted on a substrate, comprising:

provinding a polymer positive temperature coefficient component that includes a PTC polymeric layer having two opposite surfaces, and first and second electrodes respectively disposed on the two opposite surfaces of the PTC polymeric layer;

disposing a first electrically conductive unit on the first electrode oppositely of the PTC polymeric layer, bending the first electrically conductive unit, so that the first electrically conductive unit includes a first electrically conductive member and a first conductive pin member, the first electrically conductive member being disposed on and electrically connected to the first electrode layer oppositely of the PTC polymeric layer and having an end portion, the first conductive pin member being inclinedly extending from the end portion of the first electrically conductive member toward the substrate and having a first distal end which is distal from the end portion of the first electrically conductive member and is to be in contact with the substrate, wherein a first stand-off height from the first electrically conductive member to the first distal end ranges from 1.0 mm to 2.0 mm;

disposing a second electrically conductive unit on the second electrode oppositely of the PTC polymeric layer, bending the second electrically conductive unit, so that the second electrically conductive unit includes a second electrically conductive member and a second conductive pin member, the second electrically conductive member being disposed on and electrically connected to the second electrode layer oppositely of the PTC polymeric layer and having an end portion, the second conductive pin member being inclinedly extending from the end portion of the second electrically conductive member toward the substrate, and having a second distal end which is distal from the end portion of the second electrically conductive member and is to be in contact with the substrate, wherein a second stand-off height from the first electrically conductive member to the second distal end ranges from 1.0 mm to 2.0 mm.

\* \* \* \* \*